Figure 1:
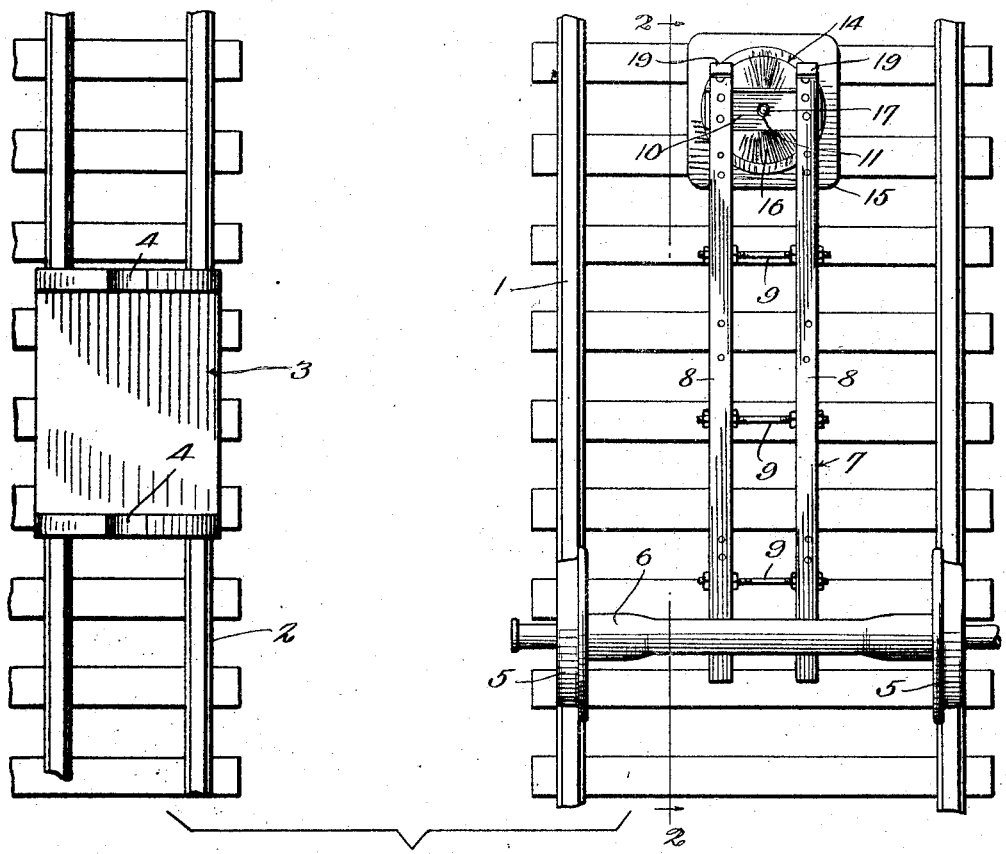

Oct. 27, 1925.

N. H. ALLISON

RAILROAD DEVICE

Filed June 22, 1925    2 Sheets-Sheet 1

1,558,571

Inventor
N. H. Allison
By C. A. Snow & Co.
Attorneys

Oct. 27, 1925.  
N. H. ALLISON  
RAILROAD DEVICE  
Filed June 22, 1925  
1,558,571  
2 Sheets-Sheet 2

Inventor  
N. H. Allison  
By C. A. Snow & Co.  
Attorneys.

Patented Oct. 27, 1925.

1,558,571

UNITED STATES PATENT OFFICE.

NORTON H. ALLISON, OF FLORENCE, KANSAS.

RAILROAD DEVICE.

Application filed June 22, 1925. Serial No. 38,814.

*To all whom it may concern:*

Be it known that I, NORTON H. ALLISON, a citizen of the United States, residing at Florence, in the county of Marion and State of Kansas, have invented a new and useful Railroad Device, of which the following is a specification.

This invention aims to provide a novel means whereby a pair of car wheels, connected by an axle, may be moved readily with a minimum expenditure of labor.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 2:
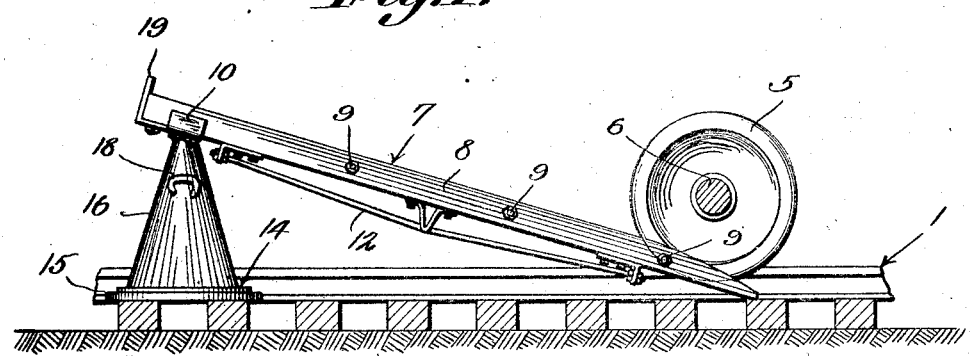
Figure 3:
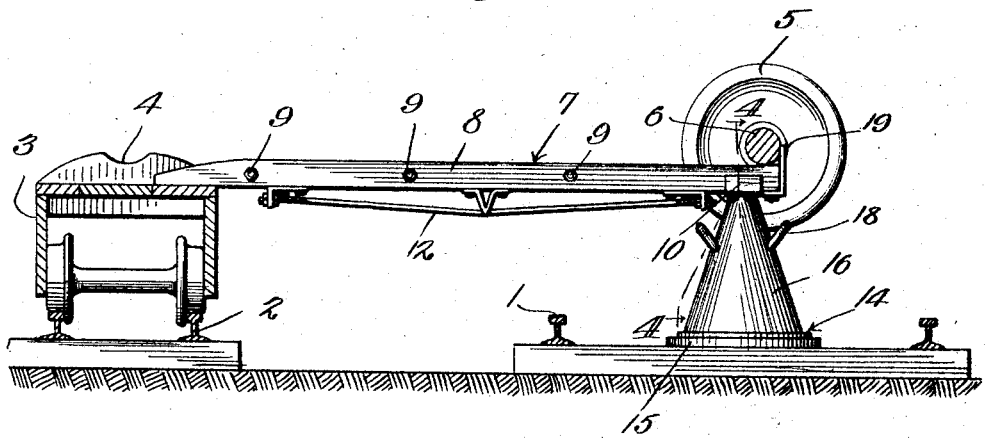
Figure 4:
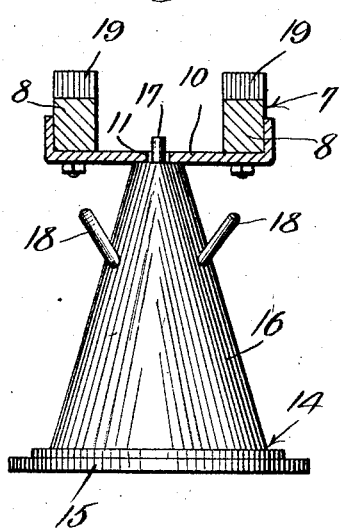
Figure 5:
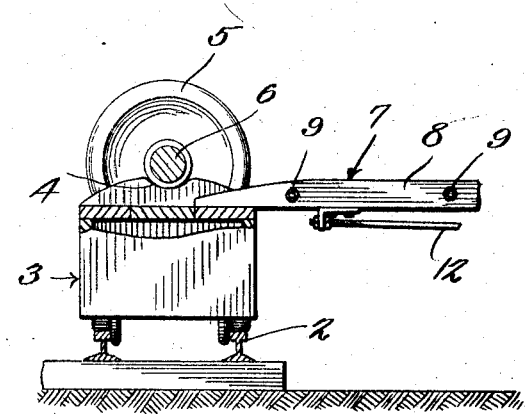

Figure 1 shows in plan, a device constructed in accordance with the invention; Figure 2 is a section on the line 2—2 of Figure 1; Figure 3 is a cross section, the skid resting on the truck; Figure 4 is a section on the line 4—4 of Figure 3; Figure 5 is a detail taken from Figure 3, the car wheels being in place on the truck.

The numeral 1 marks a main track of standard gauge which may be assumed to be in a repair yard or other place where railway vehicles are worked upon, and in which repair parts are stored. The numeral 2 designates an auxiliary track of narrow gauge, adapted to be traversed by a truck which is laden with parts that are to be carried to cars which are being repaired. In the present instance, the truck 3 which moves along the auxiliary track 2 has spaced seats 4.

The numeral 5 indicates a pair of car wheels connected by an axle 6. Such wheels are stored along the track 1, and, generally stated, it is a four-man job to carry them about, owing to their weight. The foregoing being understood, this invention aims to provide novel means whereby a pair of connected car wheels can be moved readily.

With the above object in view, there is provided a skid 7 which may be made up of rails 8 connected by braces 9 and by a yoke 10 having an opening 11, the rails of the skid being reinforced by trusses 12. The yoke 10 is located between the ends of the skid 7, but much closer to one end of the skid than to the other.

The numeral 14 marks a pedestal including a base plate 15 and a conical standard 16 having a spindle 17, there being handles 18 on the standard 16, so that the pedestal 14 can be carried about readily.

The pedestal 14 is placed between the rails of the track 1 and the skid 7 is supported in an inclined position, lengthwise of the track 1, the spindle 17 of the pedestal 14 being received in the opening 11 of the yoke 10 on the skid 7. The wheels 5 are rolled along the track 1, the axle 6 riding up on the inclined skid 7 until the axle comes into contact with stops 19 which are located at one end of the skid. This brings the weight of the wheels 5 above the pedestal 14 and the skid 7 is overbalanced a little, so that there is no difficulty in raising the lower end of the skid. The lower end of the skid is raised, and the skid is swung around until it rests on the truck 3. Then the axle 6 is rolled along the skid until the axle is received in the seats 4 of a truck 3. The skid 7 then is detached from the truck 3 and the truck, carrying the axle 6 and the wheels 5, may be rolled away to any place where the wheels are needed. With the device described, two men can do a piece of work which, heretofore, has called for the efforts, sometimes, of a half-dozen.

What is claimed is:—

1. The combination with main and auxiliary tracks, of a truck movable along the auxiliary track, a pedestal adapted to be mounted removably on the main track and a skid pivoted to the pedestal for vertical and horizontal swinging movement, the skid being of such length that it will reach from the pedestal to the truck.

2. In a device of the class described, a pedestal, and a skid pivoted near one end on the pedestal for vertical and horizontal swinging movement, and a stop on said end of the skid, for the article which is moved along the skid.

In testimony that I claim the foregoing as my own, I have hereto affixed my signature.

NORTON H. ALLISON.